United States Patent Office 3,396,177
Patented Aug. 6, 1968

3,396,177
METAL CHELATE DERIVATIVES
David Arthur Thornton, Birmingham, and Michael Edward Benet Jones, Stapleford, Cambridgeshire, England, assignors to Ciba Limited, Basel, Switzerland, a Swiss company
No Drawing. Filed Oct. 3, 1961, Ser. No. 142,527
Claims priority, application Great Britain, Oct. 6, 1960, 34,339/60
4 Claims. (Cl. 260—348)

This invention relates to metal chelate derivatives and more particularly to polyglycidyl ethers of metal chelates, the preparation and use of such compounds and compositions containing the same.

Bis- and poly-glycidyl ethers derived from bis- and polyphenols are well known as components of epoxy resins which are particularly useful as adhesives, casting and laminating resins, encapsulating resins, dipping resins, insulating materials for the electrical industry, and in the production of filling and packing materials, lacquers, varnishes and surface coating materials. The cured epoxy resins derived from the conventional polyglycidyl ethers based upon 2,2 - bis(p-hydroxyphenyl)-propane, resorcinol, hydroquinone or phenolaldehyde condensation products, whilst exhibiting stability towards a wide variety of chemical reagents, cannot be employed for prolonged periods at elevated temperatures since they undergo thermal decomposition.

It is well known that certain metal chelates, e.g. aluminum acetylacetone and copper phthalocyanine are extremely stable at elevated temperatures and such polymeric co-ordination compounds have been widely studied.

It has been found that thermally stable co-ordination polymers are those derived from compounds which contain chelate structures substituted by two or more functional groups which allow the formation of macromolecules by the well known procedures of polycondensation and polyaddition. In contrast to this, procedures involving the formation of polymers by chelation or the incorporation of metal ions in an existing polymer generally give amorphous and insoluble materials, which are difficult to use, or brittle, glassy polymers of low molecular weight and poor mechanical properties. Particularly easily handlable materials are metal chelate compounds containing two or more epoxy groups which can be cured by reaction with the hardening agents conventionally employed for epoxy resins, such as polyamines, polycarboxylic acids and anhydrides, to insoluble and infusible products of high thermal stability.

According, therefore, to a first feature of the present invention there are provided new polyglycidyl ethers of metal chelates which contain two or more phenolic hydroxyl groups, the said metal chelates conforming to the general Formula I:

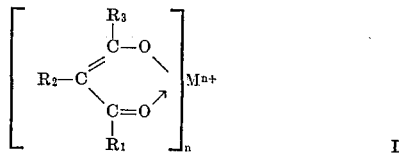

in which at least one of the substituents $R_1$, $R_2$ and $R_3$ contains a phenolic hydroxyl group and the substituents other than hydroxy or phenolic hydroxyl groups may be the same or different and each represent a hydrogen atom or an alkyl, aryl or aralkyl group, $n$ is an integer greater than 1 and $M^{n+}$ represents a metal ion or complex metal ion of valency $n$.

According to a further feature of the invention the aforesaid ethers are prepared by the reaction of said metal chelates containing two or more phenolic hydroxyl groups with an epihalohydrin.

A typical example of a compound conforming to general Formula I is a tris[1 - (p - hydroxyphenyl) - 1,3-butandiono] aluminum which has the structure shown in Formula II

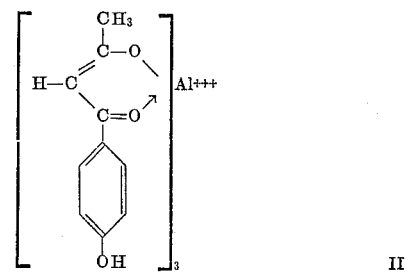

the production of which is desribed in our copending application Ser. No. 128,386, filed Aug. 1, 1961 now abandoned.

The following are examples of metal ions which are suitable components of the metal chelate compounds of the invention, for example as representative of the metal ions designated $M^{n+}$ in the foregoing general formula:

$Be^{II}$, $Mg^{II}$, $Al^{III}$, $Ca^{II}$, $Cr^{III}$, $Mn^{III}$, $Fe^{III}$, $Co^{III}$, $Ni^{II}$, $Cu^{II}$, $Zn^{II}$, $Sr^{II}$, $Ba^{II}$, $Zr^{IV}$, $Cd^{II}$, $Ce^{IV}$, $Hg^{II}$, $Pb^{II}$, $Th^{IV}$ and complex ions including $V^{IV}O$, $U^{VI}O_2$, $Mo^{VI}O_2$.

The condensation of metal chelate compounds which contain at least two phenolic hydroxyl groups with an epihalohydrin, such as epichlorohydrin and glycerol dichlorohydrin, is preferably conducted in an organic solvent medium and with an excess of the epihalohydrin, e.g., three to five moles of epihalohydrin per mole of phenolic hydroxyl group. The actual method of condensation employed depends on the solubility and alkali or acid stability of the chelated bis- or polyphenol used in the reaction.

The polyglycidyl ethers produced by the process of the invention differ widely in physical properties, from viscous gums to high melting solids, such variations not only depending on the type of ligand present, but also on the nature of the metal ion or complex metal ion utilized in the formation of the chelate from the ligand. However, all the chelates thus formed can be fused and can be cured to high molecular weight products by treatment with the usual hardeners employed for the curing of conventional epoxy resins.

According to a further feature of the invention therefore hardenable compositions comprise one or more polyglycidyl ethers of metal chelates which contain two or more phenolic hydroxyl groups, as defined above, and one or more hardening agents therefor.

The following hardeners for the curing process have been found to be suitable: amines such as aliphatic and aromatic primary, secondary and tertiary amines, e.g., mono-, di- and tri-butylamine, p-phenylenediamine, bis-(p-aminophenyl)methane, ethylenediamine, N,N-diethylethylenediamine, diethylenetriamine, tetra(hydroxyethyl)-diethylenetriamine, triethylenetetramine, tetraethylenepentamine, trimethylamine, diethylamine, triethanolamine, Mannich bases, piperidine, guanidine and guanidine derivatives such as phenylguanidine and diphenylguanidine, dicyandiamide, anilineformaldehyde resins, polymers of amino-styrenes, polyamides, e.g. those from aliphatic polyamines and di- or tri-merized unsaturated fatty acids, isocyanates, isothiocyanates, polyhydric phenols, e.g., resorcinol, hydroquinone, bis - (4 - hydroxyphenyl) - dimethylmethane and quinone, phenol-aldehyde resins, oil-modified phenol aldehyde resins, reaction products of aluminum alkoxides or phenolates with tautomeric reacting compounds of the acetoacetic ester type, Friedel-Crafts catalysts, e.g., $AlCl_3$, $SbCl_5$, $SnCl_4$, $ZnCl_2$, $BF_3$, and their complexes with organic compounds and phosphoric acid. In some cases accelerators for the hardening action may also be present; suitable such accelerators for curing with carboxylic acid anhydrides are tertiary amines and polyhydroxy compounds such as hexanetriol and glycerol.

Other epoxides may also be present in the compositions of this invention, e.g., mono- or poly-glycidyl ethers of mono- or polyalcohols, such as butyl alcohol, butane-1,4-diol or glycerine, or of mono- or poly-phenols, such as resorcinol, bis - (4 - hydroxyphenyl)-dimethylene or condensation products of aldehydes with phenols (Novolaks), polyglycidyl esters of polycarboxylic acids, such as phthalic acid, or amino-polyepoxides such as are obtained by dehydrohalogenation of the reaction products from epihalohydrins and primary or secondary amines such as n - butylamine, aniline or 4,4' - di(monomethylamino)-diphenylmethane. The compositions of this invention may also contain fillers, plasticizers or coloring agents, for example asphalt, bitumen, glass fibers, mica, quartz powder, cellulose, kaolin, finely-divided kieselguhr (Aerosil), or metal powder.

The aforesaid compositions may be used in the filled or unfilled state, e.g. in the form of solutions or emulsions, as laminating resins, varnishes, lacquers, dipping resins, casting resins, and encapsulating, coating, filling and packing materials, adhesives and the like, as well as for the preparation of such materials.

The following examples will serve to illustrate the invention.

EXAMPLE 1

Bis[1 - (p - hydroxyphenyl) - 1,3 - butandiono]beryllium(II) (8.0 g.) was dissolved in a mixture of epichlorohydrin (70 ml.) and methyl isobutyl ketone (100 ml.). Anhydrous potassium carbonate (3.04 g.) was added and the mixture boiled under reflux with stirring. Water was continuously removed in a Dean and Stark trap until no further quantity azeotroped. The residual mixture was boiled with charcoal and filtered, the filtrate being distilled under reduced pressure to remove the solvents. The residual bis[1 - (p - hydroxyphenyl)-1,3-butandiono]-beryllium(II) diglycidyl ether (5.44 g.) solidified on cooling, softening point 70–80° C. The infrared spectrum exhibited an absorption peak at 10.95 microns, indicative of the presence of a glycidyl group, which was absent in the spectrum of the original bis-phenol.

The glycidyl ether (5.0 g.) and phthalic anhydride (1.2 g.) together with 0.05 ml. of 2,4,6-tris(dimethylaminomethyl)phenol were warmed together. Fusion occurred and curing was accomplished by heating for 5 hours at 200° C. The cured product was a hard, infusible polymer. The glycidyl ether can similarly be cured with 4,4'-diaminodiphenylmethane to yield a hard tough polymer of softening point 320° C.

EXAMPLE 2

Bis[1-(p-hydroxyphenyl) - 1,3-butandiono]copper(II) (5.0 g.) dissolved in 2-methoxyethanol (150 ml.) and epichlorohydrin (20 ml.) were boiled together under reflux, a normal solution of sodium hydroxide (24 ml.) being added dropwise to the boiling solution over a period of 2 hours. The aqueous layer was separated and the cold organic layer was filtered, the solid material being dried and recrystallized from methyl isobutyl ketone, softening point 209–212° C. The infra-red spectrum exhibited an absorption peak at 10.95 microns, indicative of the presence of a glycidyl group, which was absent from the spectrum of the original bisphenol.

The glycidyl ether can be hardened by fusion with 4,4'-diaminodiphenylmethane, yielding a tough, infusible polymer.

EXAMPLE 3

Bis 1-(p-hydroxyphenyl)-1,3-pentandiono copper (II) (15.0 g.) was dissolved in a mixture of epichlorohydrin (90 ml.) and ethylene glycol monomethyl ether (10 ml.). The solution was maintained at 60° C. whilst a solution of 0.5 g. sodium hydroxide in a mixture of 0.5 ml. water and 0.5 ml. ethylene glycol monomethyl ether was added. Thereafter powdered sodium hydroxide (2.2 g.) was added in five separate equivalent batches over a period of 1.5 hours. After maintaining the mixture for a further 0.5 hr. at 60° C., it was filtered whilst hot. The filtrate was cooled and filtered. The precipitate collected was recrystallized from benzene, yielding 7.2 g. pale green product. After four recrystallizations from benzene it melted at 186–190° C. and had the following analysis: Found: C, 59.5; H, 5.4; O, 23.5; Cu, 11.6%. $C_{28}H_{30}O_8$ Cu requires: C, 60.4; H, 5.4; O, 22.9; Cu, 11.4%.

What is claimed is:

1. A metal chelate which contains at least 2 and at the most 4 glycidyloxyphenyl groups and which has the formula

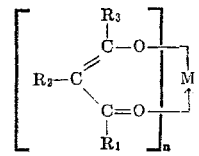

in which $R_1$ is p-glycidyloxyphenyl, $R_2$ is hydrogen and $R_3$ is methyl or ethyl, and M is divalent beryllium or divalent copper.

2. The diglycidyl ether of bis-(1-(p-hydroxyphenyl)-1,3-butandiono) beryllium.

3. The diglycidyl ether of bis-(1-(p-hydroxyphenyl)-1,3-butandiono) copper$^{II}$.

4. The diglycidyl ether of bis-(1-(p-hydroxyphenyl)-1,3-pentandiono) copper $^{II}$.

References Cited

UNITED STATES PATENTS 2,876,208   3/1959   Naps _____ 260—47
3,014,939   12/1961   Klurber _____ 260—429

NORMA S. MILESTONE, *Primary Examiner.*